United States Patent [19]

Zanders et al.

[11] Patent Number: 5,652,539
[45] Date of Patent: Jul. 29, 1997

[54] ROWER REGULATOR

[75] Inventors: Gary V. Zanders, Plano; Donald R. Dias, Carrollton; Robert D. Lee, Denton, all of Tex.

[73] Assignee: Dallas Semiconductor Corporation, Dallas, Tex.

[21] Appl. No.: 486,563

[22] Filed: Jun. 7, 1995

Related U.S. Application Data

[60] Division of Ser. No. 253,445, Jun. 7, 1994, Pat. No. 5,638,418, which is a continuation-in-part of Ser. No. 13,883, Feb. 5, 1993, Pat. No. 5,388,134.

[51] Int. Cl.⁶ ........................................................ G05F 1/10
[52] U.S. Cl. ................................................ 327/539; 327/543
[58] Field of Search ...................................... 327/538, 541, 327/543, 540, 539

[56] References Cited

U.S. PATENT DOCUMENTS

| | | | |
|---|---|---|---|
| 4,211,919 | 7/1980 | Ugon | 235/487 |
| 4,480,178 | 10/1984 | Miller, II et al. | 235/380 |
| 4,505,599 | 3/1985 | Nonaka | 374/163 |
| 4,511,796 | 4/1985 | Aigo | 235/492 |
| 4,551,031 | 11/1985 | Ishikawa et al. | 374/117 |
| 4,556,958 | 12/1985 | Ugon | 364/200 |
| 4,602,871 | 7/1986 | Hanaoka | 374/102 |
| 4,621,190 | 11/1986 | Saito et al. | 235/492 |
| 4,658,407 | 4/1987 | Iwama | 377/25 |
| 4,748,320 | 5/1988 | Yorimoto et al. | 235/492 |
| 4,767,918 | 8/1988 | Kushima et al. | 235/441 |
| 4,771,393 | 9/1988 | Ishida et al. | 364/557 |
| 4,782,445 | 11/1988 | Pasquini | 364/400 |
| 4,816,656 | 3/1989 | Nakano et al. | 235/380 |
| 4,845,351 | 7/1989 | Hara et al. | 235/492 |
| 4,868,409 | 9/1989 | Tanaka et al. | 307/10 |
| 4,928,000 | 5/1990 | Eglise et al. | 235/380 |
| 5,032,708 | 7/1991 | Comerford et al. | 235/492 |
| 5,180,928 | 1/1993 | Choi | 327/541 |
| 5,355,033 | 10/1994 | Jang | 327/541 |
| 5,396,113 | 3/1995 | Park et al. | 327/543 |

FOREIGN PATENT DOCUMENTS

0147099  7/1984  European Pat. Off. .

*Primary Examiner*—Margaret Rose Wambach

[57] ABSTRACT

A power regulator for providing a fixed output voltage that is consistent with a reference voltage and independent of a varying power supply, includes a first input connected to a reference voltage generator; a second input adapted to be connected to a varying power supply; two outputs for connection to circuitry such as oscillators; a charge pump; and three transistors. The drain and gate of the first transistor are connected to the charge pump and the source is connected to the reference voltage generator; the gate of the first transistor is coupled to the gates of the second and third transistors; and the sources of the second and third transistors are coupled one of the two outputs.

4 Claims, 6 Drawing Sheets

ROWER REGULATOR

CROSS-REFERENCE TO RELATED APPLICATIONS

This application hereby is a division of application Ser. No. 08/253,445 filed Jun. 7, 1994, now U.S. Pat. No. 5,638.418 which is a continuation-in-part of application Ser. No. 08/013,883, filed Feb. 5, 1993, now U.S. Pat. No. 5,388,134, issued Feb. 7, 1995.

In addition, Applicants also incorporate by reference the data sheet for the DS 1620, which is included in the Appendix A and a listing of software used to enhance resolution, which is included in Appendix B.

PARTIAL WAIVER OF COPYRIGHT PURSUANT TO 1077 O.G 22(Mar.20, 1987)

© Copyright, Dallas Semiconductor Corporation 1994. All of the material in this patent application is subject to copyright protection under the copyright laws of the United States and of other countries. As of the first effective date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

FIELD OF THE INVENTION

The present invention relates to electronic devices, and, more particularly, to integrated power supply regulator systems.

BACKGROUND

Accurate and timely temperature information is needed in a host of applications in modern industrial society. For instance, temperature monitoring is required in controlling processes, maintaining controlled environments (e.g., temp-cycle test equipment, air conditioning), monitoring equipment, and monitoring exposure. Moreover, automatic (electronic) systems (e.g., process control systems) typically require all electronic temperature measurement systems and the data provided by in a digital format, so that microcontrollers and microprocessors often used in those applications can readily accept and process the temperature information. However, the reliability and accuracy of existing temperature measurement devices is often compromised due to the unstable and widely varying voltages and loads used in these devices.

SUMMARY OF THE INVENTION

The provided power supply regulator coordinates power input to the temperature sensing circuitry and to the calibration circuitry. The temperature sensing circuitry, calibration circuitry, and power supply regulator are preferably combined into an integrated circuit. Note that while numerous modifications exist, the resolution can be increased by reading the actual values contained in the registers and/or not rounding the values contained therein. In addition, note that the modifications to enhance resolution are independent of the power regulation circuitry, so that the power regulation circuitry is not necessarily needed for some applications.

The power regulator preferably regulates the power supply over a wide range of global power supply voltages in order to insure a fixed power supply. In addition, the power regulator enables the power supply to provide a fairly large amount of current (e.g., >1 mA). The charge pump permits the power supply to remain regulated, even when power supplied to it is extremely low. However, when $V_{DD}$ goes to about 3 volts, regulation is killed, so the lower limit of $V_{DD}$ is limited to around 3.5 volts. Preferred circuit embodiments of the power regulator comprise a charge pump input having an output coupled to the drain and gate of a first transistor. The source of the first transistor is coupled to the output of a reference voltage generator to provide $V_{REF}$. The gate of the first transistor is preferably coupled to the gates of a second transistor and a third transistor. The sources of the second transistor and the third transistor are coupled to power the first and second oscillators respectively. Disclosed circuitry operates with supply voltages of 3.5 V to 5.5 V and consumes no more that 55 µA when operating and leakage only when in a standby condition.

BRIEF DESCRIPTION OF THE DRAWINGS

Further features and advantages will become apparent from the following and more particular description of the various embodiments of the invention, as illustrated in the accompanying drawings, wherein.

DETAILED DESCRIPTION OF THE PREFERRED EMBODIMENTS

Figures 1, 3:
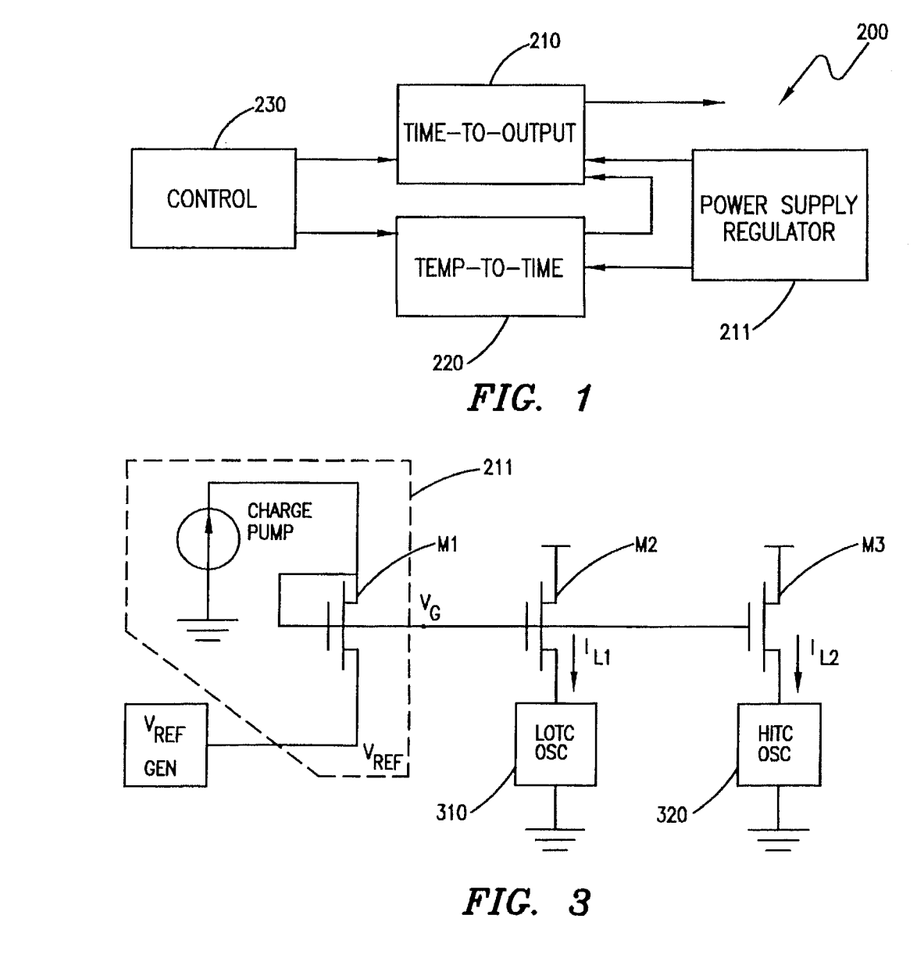
FIG. 1 is a functional/structural block circuit diagram showing the improved power supply regulator combined with the functional/structural block circuit diagram of a temperature detector.
FIG. 3 is a preferred circuit diagram of a power supply regulator along with a temperature-dependent oscillator and a temperature-independent oscillator as similarly shown in FIGS. 1 and 2.

FIG. 1 is a functional/structural block circuit diagram showing the improved power supply regulator 211 combined with the functional/structural block circuit diagram of a preferred embodiment of temperature detector 200. The use of power supply regulator 211 is preferred, because time-to-output converter 210 and temperature-to-time converter 220 were found to have a significant dependence upon $V_{DD}$—thereby providing two different readings at a constant temperature. As a result, power supply regulator 211 was added to regulate the power supplied to time-to-output converter 210 and temperature-to-time converter 220. Preferred embodiments use power supply regulator 211, because it is unconditionally stable, tolerant to widely varying $V_{DD}$ and loads, and capable of supplying a regulated voltage within 0.6 V of the power supply. In addition, preferred embodiments prefer a source follower output, but this normally would require a gate voltage higher than $V_{DD}$. Preferred embodiments of power supply regulator 211 are discussed below.

Figure 2:
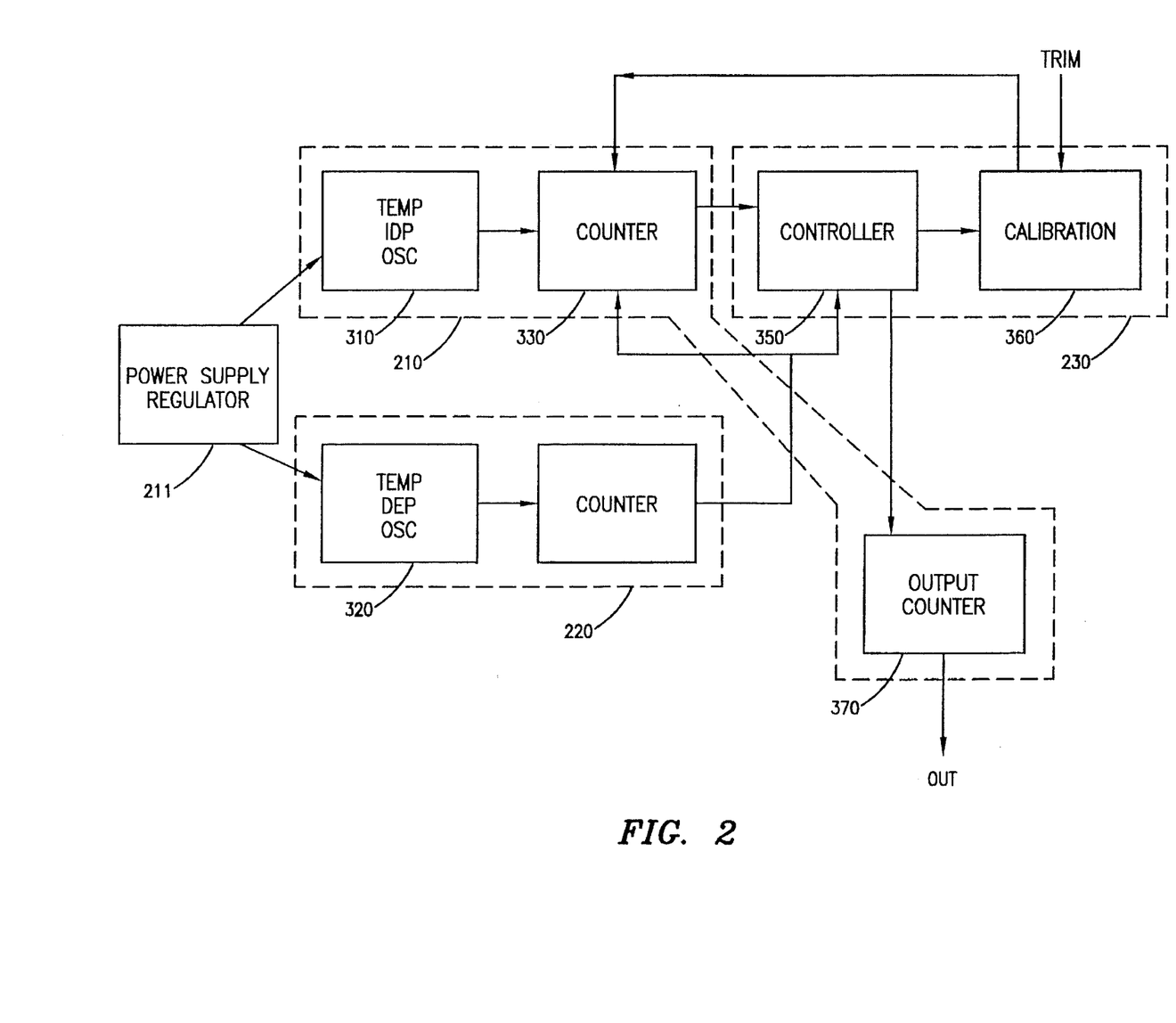
FIG. 2 is a more detailed preferred block diagram of the temperature detector as similarly shown in FIG. 1 with a power supply regulator combined with a functional/structural block circuit diagram of a temperature detector.

Similarly, FIG. 2 is a more detailed preferred block diagram of the temperature detector 200, shown in FIG. 1 showing the improved power supply regulator 211 combined with the functional/structural block circuit diagram of a preferred embodiment of temperature detector 200.

Temperature insensitive oscillator 310 employs polysilicon resistors and temperature sensitive oscillator 320 uses diffused resistors; this difference provides the temperature sensitivity characterizations of the oscillators. Indeed, temperature sensitive oscillator 320 slows down more than temperature insensitive oscillator 310 as temperature increases due to its greater TCR resistors. Also, oscillators 310 and 320 each oscillate at about 200 Khz, so the period is on the order of a 5 microseconds (μs) and this makes the propagation delay K, which is roughly 100 nanoseconds (ns), small compared to the RLC term in the oscillation period expression.

Figure 4:
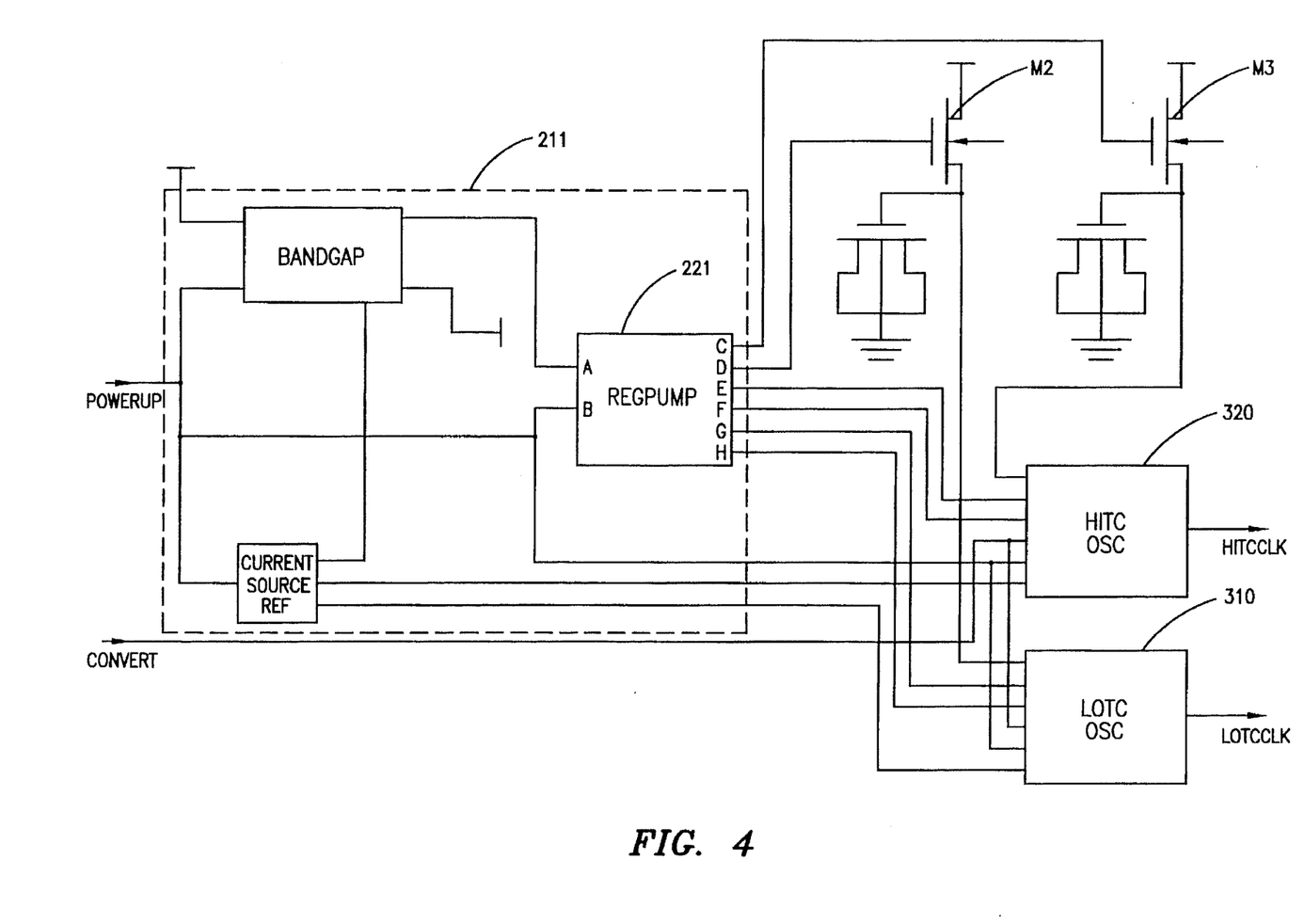
FIG. 4 is a preferred circuitry of a power supply regulator along with the temperature-dependent oscillator ((High ("hi") Temperature Coefficient ("TC") Oscillator ("OSC")) and temperature-independent oscillator ((Low ("lo") Temperature Coefficient ("TC") Oscillator ("OSC")) shown in FIGS. 1, 2, and 3.
Figure 5:
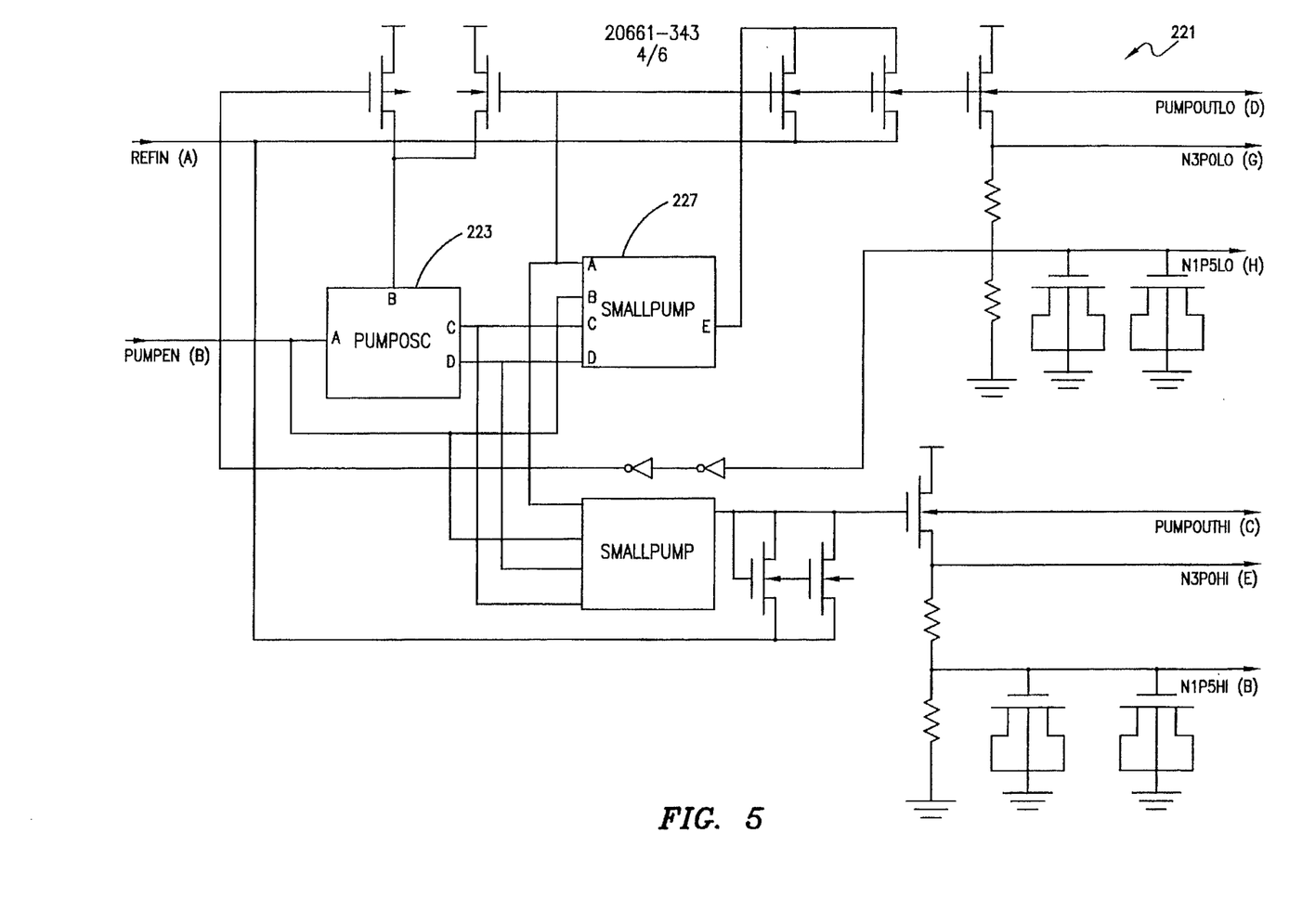
FIG. 5 is the schematic of preferred circuitry for "reg-pump" block as similarly shown in FIG. 4, which is used to regulate the charge pump.
Figure 6:
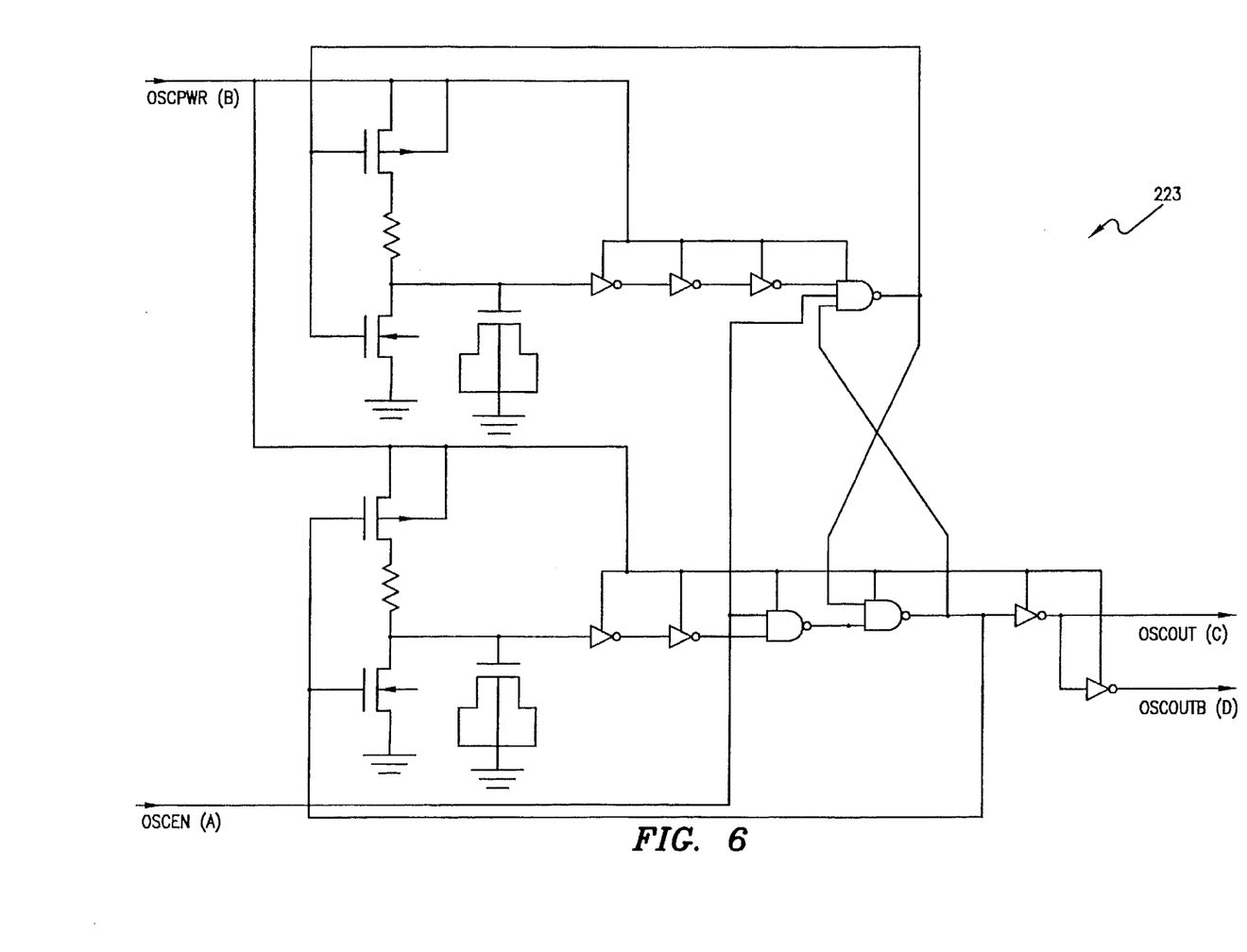
FIG. 6 is the schematic of preferred circuitry for "pump-posc" block as similarly shown in FIG. 5, which is used to regulate the charge pump.
Figure 7:
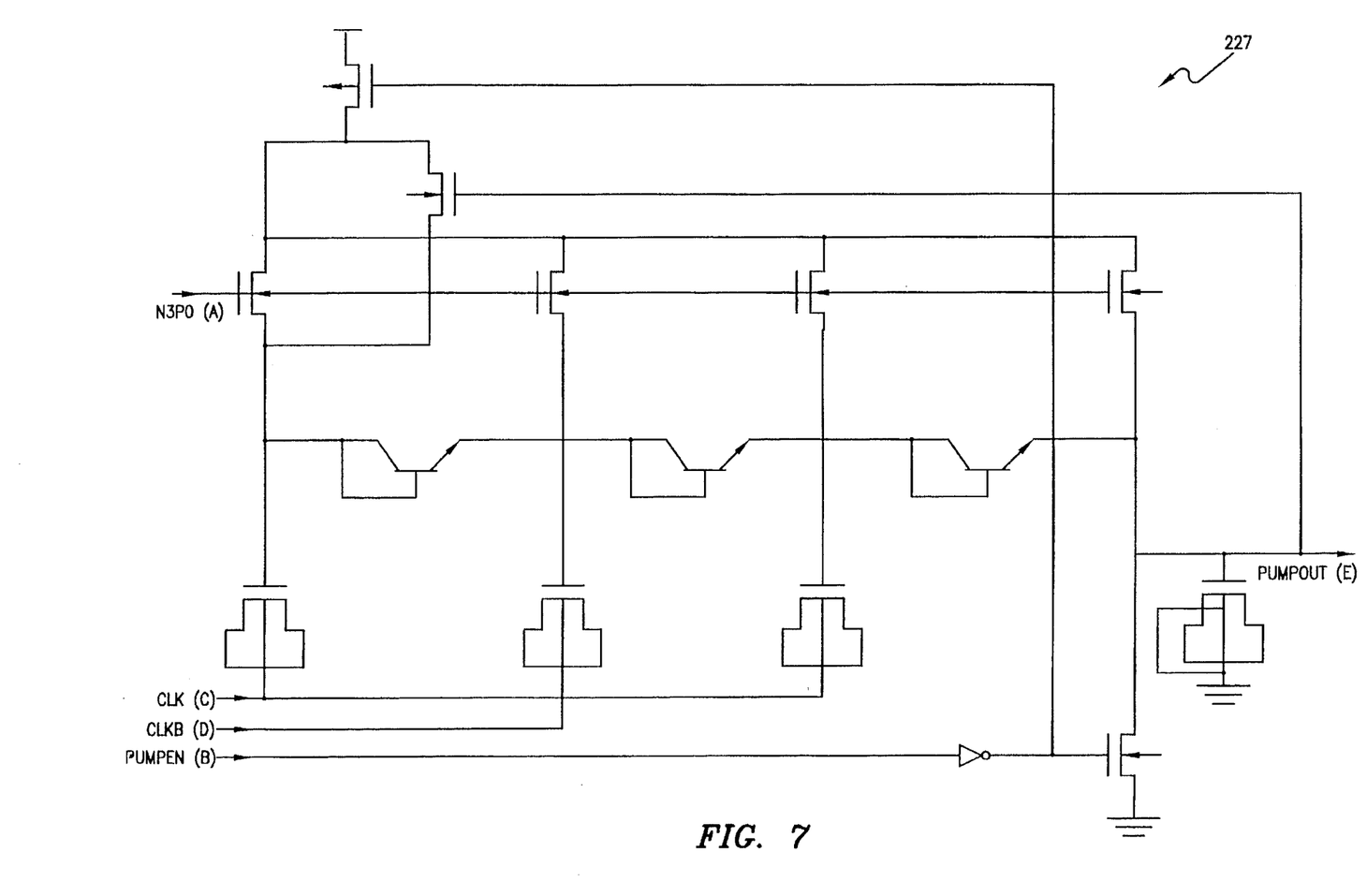
FIG. 7 is the schematic of preferred circuitry for "small-pump" block as similarly shown in FIG. 5, which is used to regulate the charge pump.

Referring again to power supply regulator 211 shown in FIGS. 1 and 2 and described briefly above, FIG. 3 is a preferred circuit diagram of power supply regulator 211 along with temperature-dependent oscillator 320 (High ("hi") Temperature Coefficient ("TC") Oscillator ("OSC")) and temperature-independent oscillator 310 (Low ("lo") Temperature Coefficient ("TC") Oscillator ("OSC")) shown in FIGS. 1 and 2. FIG. 4 is the preferred circuitry of power supply regulator 211 along with temperature-dependent oscillator 320 (High ("hi") Temperature Coefficient ("TC") Oscillator ("OSC")) and temperature-independent oscillator 310 ((Low ("lo") Temperature Coefficient ("TC") Oscillator ("OSC")) shown in FIGS. 1, 2, and 3. FIG. 5 is the schematic of preferred circuitry for "regpump" block 221 of FIG. 4, which is used to regulate the charge pump. FIG. 6 is the schematic of preferred circuitry for "pumposc" block 223 of FIG. 5, which is used to regulate the charge pump. FIG. 7 is the schematic of preferred circuitry for "smallpump" block 227 of FIG. 5, which is used to regulate the charge pump. As was described above, improved power supply regulator 211 is combined with the functional/structural block circuit diagram of the preferred embodiment of temperature detector 200 shown in FIG. 1 the use of power supply regulator 211 is preferred, because time-to-output converters 210 and temperature-to-time converter 220 were found to have a significant dependence upon $V_{DD}$—thereby providing two different readings at a constant temperature. Power supply regulator 211 regulates the power supplied to time-to-output converter 210 and temperature-to-time converter 220. Power supply regulator 211, because it is unconditionally stable, tolerates to widely varying $V_{CC}$ and loads, and capable of supplying a regulated voltage within 0.6 V of the power supply.

Referring to FIG. 3 for an overall understanding of the overall system, the general operation is as follows: The $V_{REF}$ generator gives a VCC and temperature insensitive voltage output $V_{REF}$ (e.g., 3.0 V in preferred system embodiments). A weak charge pump capable of generating a voltage higher than VCC pumps until it is clamped at $V_G = V_{REF} + V_{TN}$ by MOS diode M1. $V_G$ then gates M2 and M3, which are large power supply transistors. M2 and M3 are large in order that changes in load currents $I_{L1}$ and $I_{L2}$ and in VCC have little effect on oscillator voltages shown in the following equation:

$$V_{OSC1} = V_{OSC2} = V_G - V_{TN} - \frac{\sqrt{I_L}}{K\frac{\omega}{L}} \approx V_{REF}$$

Note: $\frac{\sqrt{I_L}}{K\frac{\omega}{L}}$ is small

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

We claim:

1. A power regulator, comprising:

a first input connected to a reference voltage generator, said first input for receiving a reference voltage;

a second input adapted to be connected to a varying power supply;

a first output coupled to a first oscillator;

a second output coupled to a second oscillator;

first circuitry coupled to said first and second inputs and said first and second outputs, said first circuitry being responsive to the reference voltage to thereby provide a fixed voltage to at least one of said first and second outputs that is consistent with the reference voltage and independent of the varying power supply;

said first circuitry including first, second and third transistors, and a charge pump;

said first transistor including a first source, a first drain, and a first gate, said first source coupled to the reference voltage generator;

said charge pump having an output coupled to said first drain and said first gate of said first transistor;

said second transistor including a second source, and a second gate;

said third transistor including a third source, and a third gate;

said first gate of said first transistor coupled to each of said second gate of said second transistor and said third gates of said third transistor;

said second source of said second transistor coupled to said first oscillator; and said third source of said third transistor coupled to said second oscillator.

2. A power regulator, comprising:

a first input connected to a reference voltage generator, said first input for receiving a reference voltage;

a second input adapted to be connected to a varying power supply;

at least one output;

means coupled to said first and second inputs and said at least one output for providing a fixed voltage at said at least one output and being responsive to the reference voltage and independent of the varying power supply;

said means for providing a fixed voltage including a first transistor and a charge pump;

said first transistor including a source, a drain and a gate;

said source of said first transistor being coupled to the reference voltage generator;

said charge pump including an output coupled to said drain and said gate of said first transistor.

3. A power regulator as recited in claim 2 and further comprising:

a second transistor, said second transistor includes a source and a gate; said gate of said first transistor is coupled to said gate of said second transistor; and said source of said second transistor is coupled to said at least one output.

4. A power regulator as recited in claim 3 and further comprising:

a third transistor and a second output, said third transistor includes a source and a gate;

said gate of said first transistor is coupled to said gate of said third transistor; and said source of said third transistor is coupled to said second output.

* * * * *

UNITED STATES PATENT AND TRADEMARK OFFICE
CERTIFICATE OF CORRECTION

PATENT NO.    : 5,652,539
DATED         : Jul. 29, 1997
INVENTOR(S)   : Zanders et al.

It is certified that error appears in the above-identified patent and that said Letters Patent is hereby corrected as shown below:

Title Page, Item [54]     Replace "ROWER"
                              With --POWER--

Column 1, line 1          Replace "ROWER"
                              With --POWER--

Signed and Sealed this

Fourteenth Day of April, 1998

Attest:

BRUCE LEHMAN

*Attesting Officer*            *Commissioner of Patents and Trademarks*